US010882353B2

(12) United States Patent
Fauser et al.

(10) Patent No.: US 10,882,353 B2
(45) Date of Patent: Jan. 5, 2021

(54) VEHICLE WHEEL WITH COVER ELEMENTS FOR THE SPACES BETWEEN THE SPOKES

(71) Applicant: Bayerische Motoren Werke Aktiengesellschaft, Munich (DE)

(72) Inventors: Markus Fauser, Munich (DE); Hubert Scholz, Munich (DE); Matthias Ruderer, Bayreuth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 403 days.

(21) Appl. No.: 15/989,522

(22) Filed: May 25, 2018

(65) Prior Publication Data

US 2018/0272798 A1  Sep. 27, 2018

Related U.S. Application Data

(63) Continuation of application No. PCT/EP2016/078866, filed on Nov. 25, 2016.

(30) Foreign Application Priority Data

Nov. 26, 2015  (DE) .......... 10 2015 223 386

(51) Int. Cl.
*B60B 7/04* (2006.01)
*B60B 7/00* (2006.01)
(Continued)

(52) U.S. Cl.
CPC .............. *B60B 7/0086* (2013.01); *B60B 3/10* (2013.01); *B60B 7/04* (2013.01); *B60B 7/061* (2013.01);
(Continued)

(58) Field of Classification Search
CPC ....... B60B 7/0086; B60B 7/002; B60B 7/008; B60B 7/066; B60B 7/04; B60B 7/061; B60B 3/10
See application file for complete search history.

(56) References Cited

U.S. PATENT DOCUMENTS

| 4,593,953 A * | 6/1986 | Baba | B60B 7/00 |
| | | | 301/37.101 |
| 6,450,582 B2 * | 9/2002 | Ichikawa | B60B 7/008 |
| | | | 301/37.102 |

(Continued)

FOREIGN PATENT DOCUMENTS

| DE | 2011 010 509 A1 | 8/2012 |
| DE | 10 2012 023 405 A1 | 6/2014 |

(Continued)

OTHER PUBLICATIONS

International Search Report (PCT/ISA/210) issued in PCT Application No. PCT/EP2016/078866 dated Feb. 2, 2017 with English translation (six (6) pages).

(Continued)

*Primary Examiner* — Scott A Browne
(74) *Attorney, Agent, or Firm* — Crowell & Moring LLP

(57) ABSTRACT

A vehicle wheel has spokes, on which cover elements are provided for a space between the spokes. The cover elements deform according to the temperature in such a way that, at higher temperatures, a passage of air through a region of the space between the spokes is possible, which is covered by the cover element at lower temperatures. In this way, the cover elements do not entirely cover the respective spaces between the spokes, and a rigid cap element is provided per intermediate space in addition to a cover element deforming according to the temperature. Alternatively, two cover elements are provided in each space between the spokes, next to one another in the circumfer- (Continued)

ential direction of the wheel, wherein in the deformed state, one of the cover elements is curved outwards and the other cover element is curved inwards towards the vehicle.

16 Claims, 4 Drawing Sheets

(51) Int. Cl.
  *B60B 3/10* (2006.01)
  *B60B 7/06* (2006.01)
  *B60B 1/06* (2006.01)

(52) U.S. Cl.
  CPC ............ *B32B 2605/00* (2013.01); *B60B 1/06* (2013.01); *B60B 2310/318* (2013.01); *B60B 2360/341* (2013.01); *B60B 2900/1216* (2013.01); *B60B 2900/513* (2013.01); *Y02T 10/88* (2013.01)

(56) References Cited

U.S. PATENT DOCUMENTS

| | | | |
|---|---|---|---|
| 2009/0195053 A1* | 8/2009 | Kruse | B60B 19/10 301/6.4 |
| 2011/0156507 A1 | 6/2011 | Lin et al. | |
| 2014/0290844 A1 | 10/2014 | Haruyama | |

FOREIGN PATENT DOCUMENTS

| | | | |
|---|---|---|---|
| DE | 10 2013 114 476 A1 | 6/2014 | |
| DE | 10 2013 222 044 A1 | 4/2015 | |
| EP | 0 145 487 A2 | 6/1985 | |
| EP | 1 319 526 A2 | 6/2003 | |
| EP | 2 475 475 B1 | 12/2013 | |
| FR | 2 998 507 A1 | 5/2014 | |
| FR | 3003200 A1 * | 9/2014 | ........... B60B 7/0086 |
| FR | 3057806 A1 * | 4/2018 | ............... B60B 7/04 |
| JP | 4-2502 A | 1/1992 | |
| JP | 04002502 A * | 1/1992 | ........... B60B 7/0086 |

OTHER PUBLICATIONS

German-language Written Opinion (PCT/ISA/237) issued in PCT Application No. PCT/EP2016/078866 dated Feb. 2, 2017 (five (5) pages).

German-language Search Report issued in Application No. 10 2015 112 386.3 dated Aug. 26, 2016 with partial English translation (thirteen (13) pages).

* cited by examiner

VEHICLE WHEEL WITH COVER ELEMENTS FOR THE SPACES BETWEEN THE SPOKES

CROSS REFERENCE TO RELATED APPLICATIONS

This application is a continuation of PCT International Application No. PCT/EP2016/078866, filed Nov. 25, 2016, which claims priority under 35 U.S.C. § 119 from German Patent Application No. 10 2015 223 386.3, filed Nov. 26, 2015, the entire disclosures of which are herein expressly incorporated by reference.

BACKGROUND AND SUMMARY OF THE INVENTION

The invention relates to a vehicle wheel having spokes, on which cover elements are provided for a space between the spokes. The cover elements deform according to the temperature in such a way that, at higher temperatures, a passage of air through a region of the space between the spokes is possible, which is covered by the cover element at lower temperatures. As for the prior art, refer for example to DE 10 2013 222 044 A1.

In order to streamline the wheels of a vehicle as much as possible in regard to a low air resistance, it would be advantageous for its annular section between the hub area and the rim holding a pneumatic tire to be fully covered on the outside, but this is not representable in continuous manner, at least in the case of two-track motor vehicles which usually have wheel brakes arranged on the inner side of the wheel facing the vehicle, on account of the cooling of the wheel brakes when necessary. Therefore, various designs have already been proposed for a variable covering of the spaces between the spokes of conventional spoked wheels, such that these intermediate spaces are covered at lower temperatures and opened at higher temperatures, which occur during a braking event as a result of the heat produced at the wheel brake, designed as a friction brake, in order to accomplish a cooling of the wheel brake by increasingly flowing surrounding air.

In the above mentioned DE 10 2013 222 044 A1, cover elements are shown for the spaces between the spokes of a vehicle wheel in the form of a so-called rim cover with wing elements which are designed as a layer composite made of materials with different coefficients of thermal expansion, so that they become deformed by themselves in a suitable manner due to the bimetallic effect. For example, this convincing per se technology will be represented in the present case in a structurally reliable form, i.e., it shall be indicated how deformable cover elements for the spaces between the spokes of a wheel of a vehicle and especially that of a motor vehicle which can travel at high driving speed can be designed and mounted on the wheel. In particular, these cover elements should remain securely on the wheel even at driving speeds of the order of 200 km/h and be fully functional at a lower speed, e.g., of the order of 100 km/h, i.e., they are able to expose the formerly covered region of the space between the spokes without any damage (=the problem of the present invention).

A first solution of this problem for such a vehicle wheel with spokes is characterized in that the cover elements do not entirely cover the respective spaces between the spokes, and a rigid cap element is provided per intermediate space in addition to a cover element deforming according to the temperature, which continuously covers the region of the space between spokes associated with it. A second alternative solution of this problem for such a vehicle wheel with spokes is characterized in that two cover elements are provided in each space between the spokes, lying next to each other in the circumferential direction of the wheel, and secured to different spokes, and in the non-deformed state they border closely against each other by their edges facing away from the spokes, while in the deformed state one of the cover elements is curved outward from the vehicle, looking in the direction of the wheel's axis of rotation, and the other cover element is curved inward toward the vehicle.

Preferably, the cover elements in the non-deformed state which they adapt at normal or lower temperatures, i.e., in the normal state, have an at least approximately flat shape, while in the deformed state and only at higher temperatures, which occur on account of a rather heavy braking event of the vehicle outfitted with this wheel, they are suitably curved or otherwise not flat. Said deformation or curvature may of course occur only such a region of a cover element which is sufficiently free, i.e., not otherwise attached.

Conventional motor vehicle wheels of modern passenger cars have a relatively small number of spokes, of the order of four to nine, resulting in relatively large-area spaces between the spokes. Thus, a single cover element, even a relatively large one, in the state exposing the space between spokes would be subjected to very large forces at least at higher driving speeds, which presents a serious difficulty for a structurally secure solution. Therefore, a cover element according to the invention covers only a partial region of a space between the spokes and is therefore smaller in design, so that the forces and moments acting on it are smaller, wherein it has been found that even such a smaller cover element can allow a sufficient passage of cooling air through the then exposed partial region of the space between the spokes when needed. However, in order to present a relatively low air resistance in the state covering this partial region, there is provided a further cap element, besides the cover element according to the first proposed solution covering only a partial region of the space between spokes, which does not become significantly deformed and therefore as it were continuously rigidly covers another region of the space between the spokes. According to the second proposed solution, besides a first deformable (and secured to the first marginal spoke of the space between the spokes) cover element there is provided a second deformable cover element secured on the other spoke of this space between the spokes (looking in the circumferential direction of the wheel), and these border on each other as closely as possible in the non-deformed state. In the deformed state at higher temperature, one of these two cover elements curves outward from the outside of the wheel away from the vehicle and the other one inward toward the vehicle—making it possible to represent a larger and more streamlined inflow cross section than for the first-mentioned proposed solution (which on the other hand is easier to implement). Moreover, in the first mentioned proposed solution as well it is preferably provided that the cover element is secured to one and the cap element to the other of the two spokes bounding the space between the spokes.

Moreover, when providing a rigid, non-deforming cap element, it is not mandatory for this cap element to have a substantially flat conformation and to have this (substantially two-dimensional) plane standing at least approximately perpendicular to the axis of rotation of the wheel. Instead, this cap element may also be suitably curved and it may adopt a kind of guiding function or blade function for an air flow being guided through the corresponding space between the spokes when the cover element allows this by virtue of its temperature-dependent deformation. For this purpose, the cap element may also be curved further outward away from the outside of the wheel (in regard to the vehicle on which the wheel is mounted), wherein the cover element with temperature-dependent deformation in the non-deformed state at lower temperatures then prevents an unwanted air flow through the space between the spokes by virtue of its suitable conformation. For this, the cover element in the non-deformed state may also bear slightly against the inside of the cap element, i.e., against its side facing the vehicle, although this feature is in no way mandatory. It is advantageous, however, in the case of such a non-flat conformation of the cap element, for the cover element to be deformed at higher temperatures toward the wheel inside or toward the vehicle, whereas in the case of an at least approximately flat cap element a better and more streamlined form, i.e., for a desired cooling air flow through the spaces between the spokes, of the cover element (which is substantially flat in the non-deformed state) results when the latter is deformed, e.g., curved outward by its free end region at higher temperatures, i.e., away from the vehicle.

Furthermore, it has been found to be sufficient, in order to achieve a significant improvement in the coefficient of air resistance of a passenger car, for especially the partial region of the spaces between the spokes situated further to the outside, in the radial direction, on its spoked wheels to be covered, or be able to be covered, in the best possible way, while sections of the spaces between spokes which are close to the hub (i.e., situated in proximity to the center of the wheel) can remain open continuously, which affords the benefit that a passage of cooling air between the spokes is never fully interrupted.

A favorable deforming of the cover element results when it is composed of at least two plate elements, speaking abstractly, lying as close as possible against each other, and consisting of materials with different coefficients of thermal expansion in regard to the desired bimetallic effect, and which are suitably coupled together to accomplish a desired deformation thanks to different thermal expansion. In the aforementioned document it is described that such a layer composite can be formed by casting or injection molding a plastic layer onto a fiber layer. Now, in the present instance, at least two plate elements lying one against the other are proposed for the cover element, being form-fitted together at several spot-like points in regard to at least one axial direction of a (Cartesian) coordinate system situated in the contact surface of the plate elements and perpendicular to the contact surface. Such a connection may be imagined to resemble for example the familiar LEGO building blocks, although in departure from the LEGO technique there should be in each case an at least slight undercut in the individual spot-like form fitting connection points in order to provide a secure form-fitting connection in the direction perpendicular to the contact surface of the plate elements. For example, the form-fitting connection may be formed by circular holes or oblong holes in the first plate element and spherical elements interacting with these on the second plate element. For this, one may refer for example to EP 2 475 475 B1, although there the form-fitting connection is provided only for the loose preliminary fixation of a first component on a second component and the final connection of these two components occurs there by integral bonding. The provision of oblong holes in such a form-fitting connection has the special advantage that one may establish in this way a defined curvature direction in the context of the temperature-dependent deformation of the particular cover element, since such an oblong hole affords a degree of freedom in one direction for the sphere interacting with it. The oblong holes of the form-fitting connection between the plate elements of a cover element are thus preferably oriented such that a temperature-dependent curving of the temperature-dependent deforming cover element occurs about an axis extending at least approximately in the radial direction of the wheel, because this produces the best inflow conditions for an air flow into the corresponding space between the spokes. In the direction perpendicular to this axis (substantially the circumferential direction of the wheel), the proposed oblong holes afford to the spherical elements interacting with them an at least slight latitude of movement, so that no curving or bulging due to different thermal expansions of the plate elements occurs about the latter (perpendicular to said axis) direction (=circumferential direction of the wheel).

As for the fastening of the cover elements and/or cap elements on the spokes of the wheel, they may be glued to the spokes or integrally bonded to them in general. Alternatively or additionally, however, a force-locking connection is also possible, which may be releasable (in the form of a screw fastening). Finally, the possibility of a form-fitting connection also exists here, for example once again in the form of a form-fitting spot-like connection provided at multiple points with spheres on the first element and circular holes on the second element. Moreover, a form-fitting connection in concert with a glue connection is also possible, which is secured for example by hot-pressed pins on the cover element protruding into holes provided in the spokes.

A cover element according to the invention preferably consists of at least proportionally plastic material, in which reinforcing fibers are contained. Thus, for example, on an (already mentioned) plate element of the cover element, consisting of a thermoplastic material, it is possible to weld on spherical elements, which are meant to produce an already mentioned form-fitting connection with another plate element, which may consist of a light metal, for example. In this way, an already mentioned undercut in the form-fitting connection can easily be represented. The holes or oblong holes in the other plate element can then be easily made by machining. Of course, both or all plate elements of a cover element may consist of plastic materials, wherein the differing thermal expansion behavior (for the desired bimetallic effect) may be represented by a different fraction and/or a different kind of reinforcing fiber contained in the plastic mass. It is explicitly pointed out that a vehicle wheel according to the invention need not have cover elements composed of plate elements. Instead, they may also consist, for example, of different plastic layers joined together by integral bonding (e.g., injection molded onto each other), being different from each other in terms of the reinforcing fibers contained therein, especially by their volume fractions.

Other objects, advantages and novel features of the present invention will become apparent from the following detailed description of one or more preferred embodiments when considered in conjunction with the accompanying drawings.

BRIEF DESCRIPTION OF THE DRAWINGS

In all the figures, the same elements are given the same reference numbers.

DETAILED DESCRIPTION OF THE DRAWINGS

Figure 1:
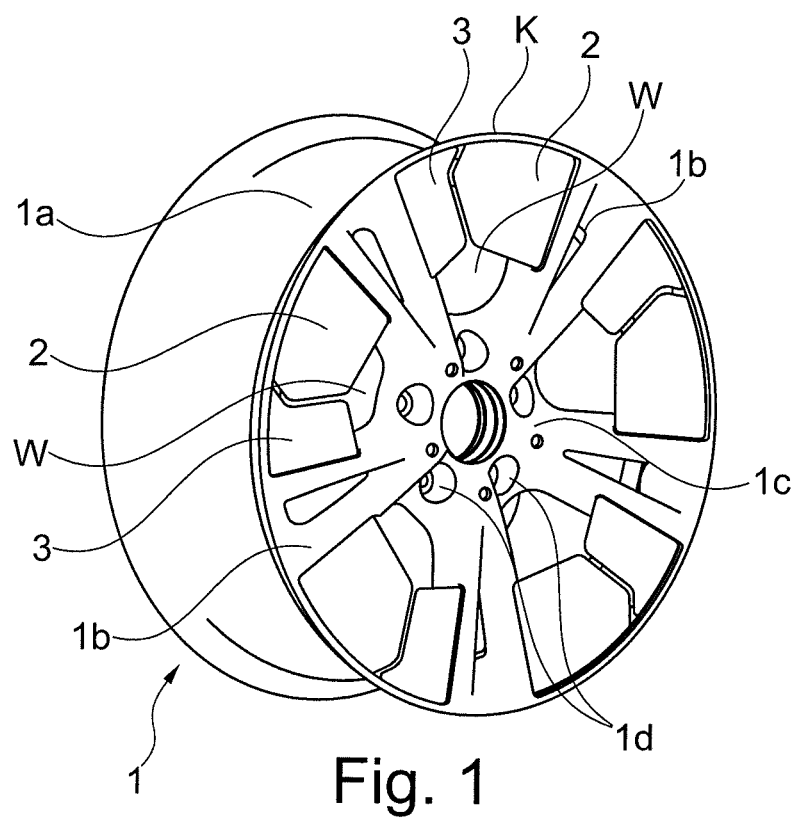
FIG. 1 shows a vehicle wheel according to an embodiment of the invention in an isometric view.

Referring to the figures, a single wheel of a vehicle, especially a passenger car, bears the reference number 1. On its rim 1a, as is usual, a tire is mounted, and the rim 1a is connected by five spokes 1b in this case to the central hub region 1c of the wheel, in which five fastening holes 1d disposed in a circular manner are provided to receive wheel screws, by means of which the wheel can be mounted onto a wheel support (carrier) of a vehicle in the usual manner.

Between spokes 1b neighboring each other in the wheel's circumferential direction U there is a space W between the spokes, which is open in the case of customary wheels, i.e., practically constituting an aperture, through which air may flow in particular. In the present wheel 1 according to the invention, at least one space W between spokes, but preferably each of the spaces W between spokes, is or can be covered for a portion by at least one cover element 2, depending on the operating point.

Figure 2:
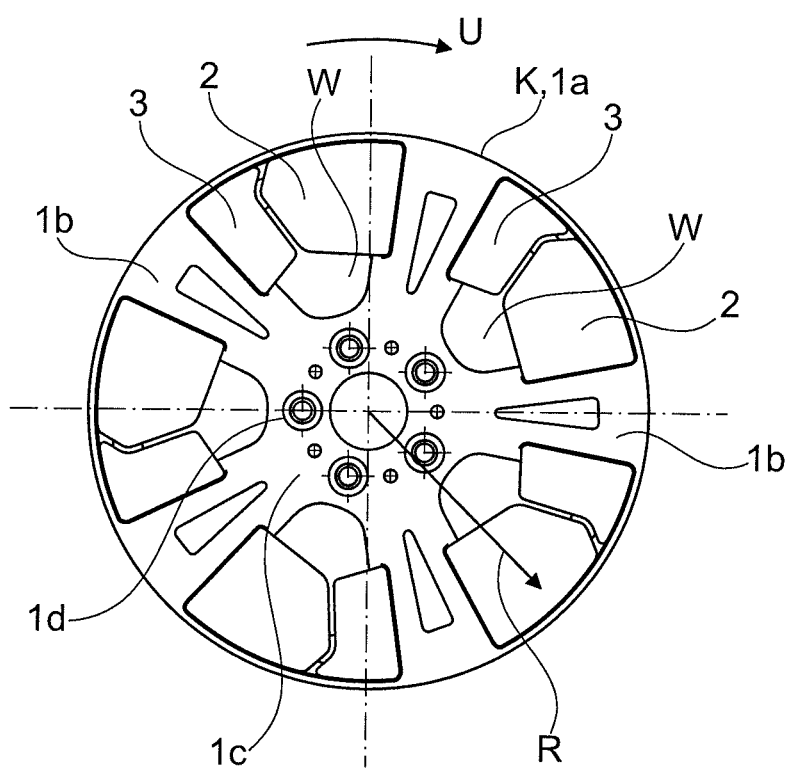
FIG. 2 is a front view of the outside of the vehicle, looking in the direction of the axis of rotation of the wheel.

Now referring to FIGS. 1 and 2, there are provided for each space W between spokes one cover element 2 and one cap element 3 arranged next to it, looking in the circumferential direction U of the wheel. In this sample embodiment, both the cap element 3 and the cover element 2 in its non-deformed state (which is thus present at lower temperatures) have a substantially flat configuration, i.e., these elements 2, 3 then have no significant curvature. Looking in the radial direction R of the wheel 1, the cover element 2 and the cap element 3 extend outwardly as much as possible almost to the edge K of the (usual) rim flange of the rim 1a. Looking in the inward radial direction R, i.e., toward the center of the wheel, the cover element 2 and the cap element 3 end at a certain distance from the hub region 1c of the wheel 1, so that a section of the space W between spokes near the hub is not covered at all.

The arrow indicating the circumferential direction U of the wheel also indicates the usual direction of rotation of the wheel secured to the vehicle during the forward driving of the vehicle, so that in future the direction of rotation or the turning direction U of the wheel will be spoken of. The cover element 2 situated in the space W between spokes alongside or behind the cap element 3 to the right in the wheel turning direction U, when viewing FIGS. 1 and 2, is fastened in a manner yet to be explained to the right-side or leading spoke 1b of the respective space W between spokes in the wheel turning direction U, and the cap element 3 situated in front of or to the left of the cover element 2 in the wheel turning direction U is fastened in a manner yet to be explained to the left-side or trailing spoke 1b of the respective space W between spokes in the wheel turning direction U.

Looking in the axial direction of rotation of the wheel 1—which extends perpendicular to the plane of the drawing in FIG. 2—the cover elements 2 and the cap elements 3 are arranged the furthest to the outside, i.e., the closest possible in the direction of the observer, so that when the cover element 2 takes on its shape at lower temperatures they achieve the most flush possible and smoothest possible surface, i.e., streamlined with the outsides of the spokes 1b facing the observer, which covers in the best possible manner, similar to an annular disk, the spaces W between the spokes at least in their further radially external sections, in order to achieve the lowest possible air resistance or coefficient of air resistance of the vehicle on which the wheel 1 is mounted. In this regard, the mutually facing end edges (extending approximately in the radial direction R) of the cover elements 2 and cap elements 3 lying in a space W between the spokes also lie as close as possible flush with each other.

As was explained prior to the description of the figures, the cover elements 2 should deform in a temperature dependent manner such that, starting from the most flush possible or most streamlined for the forward travel of the vehicle as possible, coverage of the spaces W between the spokes as described in the previous paragraph, they also make possible at higher temperatures a passage of air in the direct surroundings of the cover elements 3 (and especially on their back side, facing away from the observer in FIG. 2 at higher temperatures) in the region of the spaces W between spokes covered by them by means of this region mentioned. In this way, a wheel brake provided on the side of the wheel facing the vehicle should or can be cooled by an air flow when it becomes intensely heated. This is represented for a sample embodiment which is modified from FIGS. 1 and 2 as explained below in FIGS. 3 and 4, i.e., whereas in FIGS. 1 and 2 the cover elements 2 are represented in the non-deformed and thus usual state, FIGS. 3 and 4 show the cover elements 2, 2' there in the deformed state due to higher temperatures.

Figure 3:
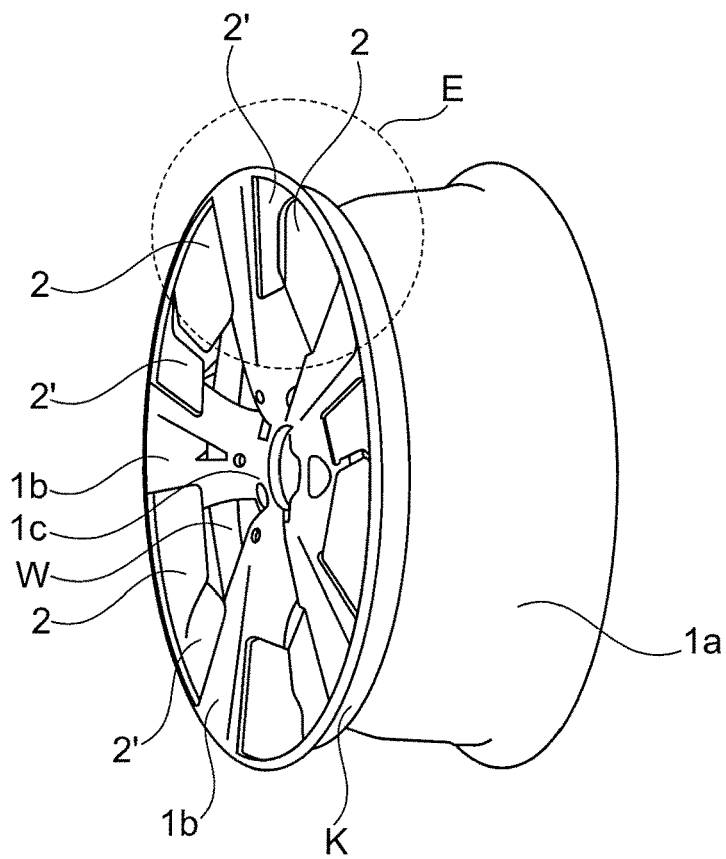
FIG. 3 is an isometric view of a wheel according to an embodiment of the invention with two slightly deformed cover elements in the space between the spokes.
Figure 4:
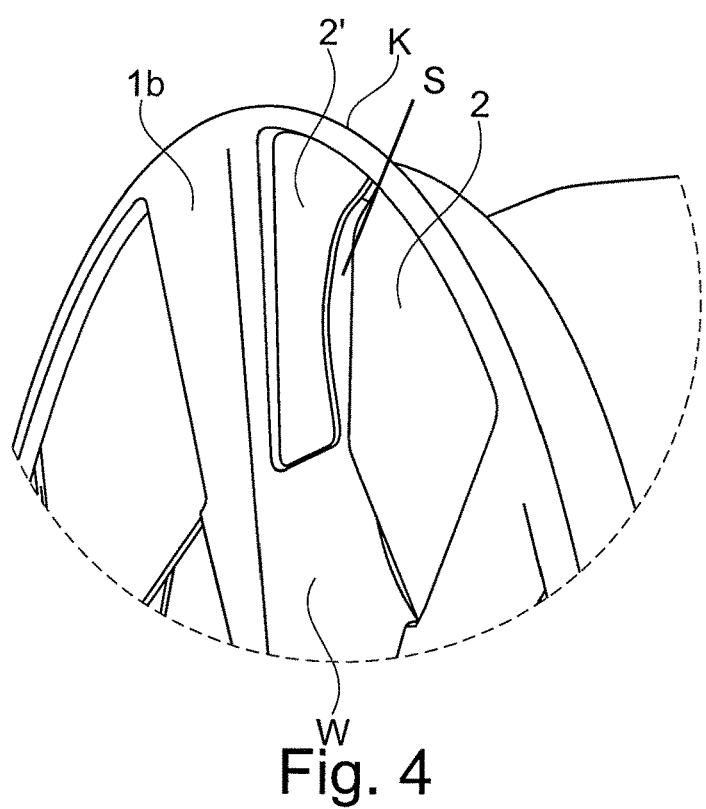
FIG. 4 shows the enlarged section E of FIG. 3.

In the exemplary embodiment of FIGS. 3 and 4, two cover elements 2, 2' are provided for each space W between the spokes, wherein the first front or right cover element 2 in the wheel turning direction U is arranged in the same place as in the sample embodiment of FIGS. 1 and 2, while the second rear or left cover element 2' in the wheel turning direction U is arranged in the same place as the cap element 3 of the sample embodiment of FIGS. 1 and 2. In particular it is seen from the detail view of FIG. 4 that the rear cover element 2' (in the depicted deformed state) is curved outward, i.e., away from the vehicle, especially in its end region facing the front cover element 2, so that a gap S is formed between the two cover elements 2, 2', through which cooling air can get through and then through the space W between spokes from the wheel outside to the wheel inside and to the wheel brake situated there. This gap S is enlarged on account of the fact that the front cover element 2 (which is also further forward in the representation of FIG. 4, i.e., situated closer to the observer), which is likewise depicted here in the deformed state, is curved slightly inward on account of higher temperatures in its end section facing the other cover element 2', i.e., toward the inside of the wheel facing the vehicle—even though this is hardly visible in these representations. In the non-deformed state, which is not shown, the mutually facing edges of the cover elements 2, 2' lie as close as possible against each other.

Now once more briefly returning to the exemplary embodiment of FIGS. 1 and 2, the cover element 2 deforming in a temperature-dependent manner is preferably configured here such that it curves outward at higher temperatures (similar to the cover element 2' of the example of FIGS. 3 and 4), since this can represent a more streamlined or larger gap S between the curved or deformed cover element 2 and the cap element 3 than if the deformation or curvature were to occur on the wheel inside.

With the aid of FIGS. 3 and 4, a further possible exemplary embodiment of the invention can now be described, in which the cover elements designated by reference number 2' in FIGS. 3 and 4 are designed as non-deformable cap elements and thus would have the reference number 3, instead of the reference number 2'. The cap elements (3) of this further possible sample embodiment would be non-flat (unlike the cap elements 3 of the first sample embodiment of FIGS. 1 and 2) and would act as air guide vanes or the like in the state of the cover elements 2 represented in FIGS. 3 and 4. With such non-flat and outwardly curved cap elements 3, the cover elements 2 would be preferably deformed inward, unlike in the first sample embodiment.

Figure 5:
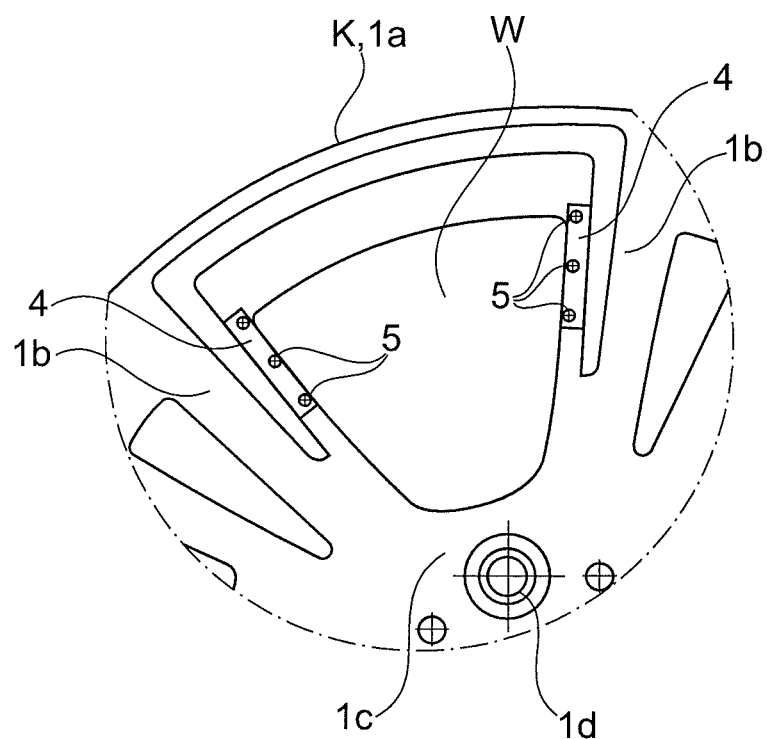
FIG. 5 is a slightly isometric view of a single space between spokes with removed cover element and cap element to illustrate their fastening.
Figure 6:
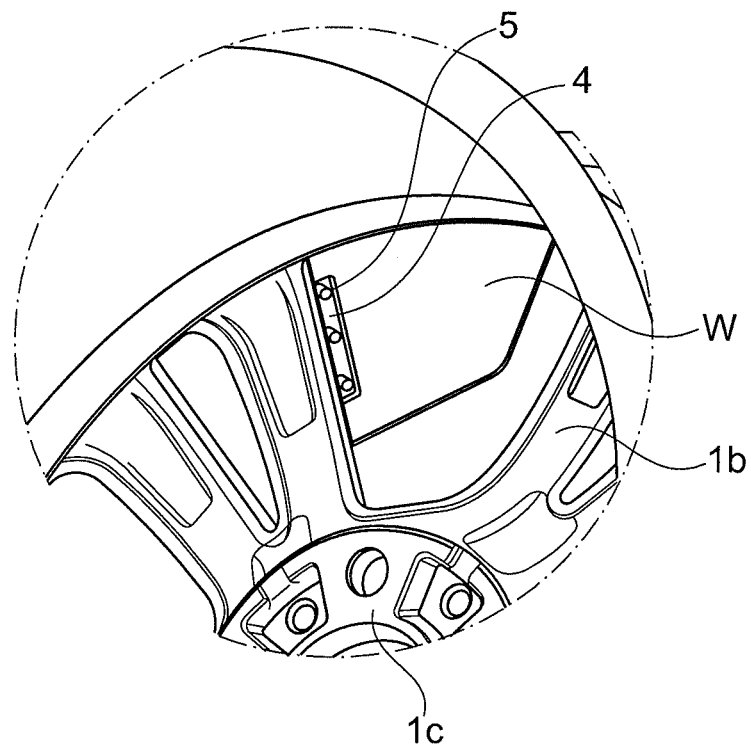
FIG. 6 shows a similar section with only one spoke in somewhat modified form.

Now referring to FIGS. 5 and 6, these figures represent one possible embodiment for the fastening of a cover element (2, 2'—not shown) and cap element (3—likewise not shown). These elements are fastened primarily at the spokes 1b, since a sufficiently large area is available there for a secure fastening and since a fastening there allows the deformable cover element also to lift off from the rim flange by its marginal region facing the rim flange (or its outer edge K) and thereby it is possible to present the largest possible gap or free space for passage of an air flow through the space W between the spokes. As FIG. 5 shows, a fastening flange 4 is provided at each spoke 1b at its side facing the respective or adjacent space W between spokes, which is initially flat in conformation and provides a possibility for attachment of three (possibly additional) fastening elements 5. On the flat fastening flange 4 away from the fastening elements 5 the cover element (2) or cap element (3) can be glued on with an appropriately designed surface section and in addition force-locking or form-fitting securing elements can be provided as fastening elements 5.

In the exemplary embodiment of FIG. 5, the fastening flange 4 is milled out from the basic structure of the spoke 1b and through bores for screws (not shown) are provided as fastening elements 5 (provided optionally in addition to the mentioned glue connection), by means of which the cover element 2 or the cap element 3 can be screwed onto the respective spoke 1b. In the sample embodiment of FIG. 6, on the other hand, a fastening flange 4 is molded suitably onto the basic structure of the spoke 1b and rivet-like pins are provided as fastening elements 5' on this fastening flange 4, on which the cover element (2) or cap element (3) is virtually fitted with corresponding holes, after which a rivet head can be formed from the projecting sections of these pins.

Figure 7:
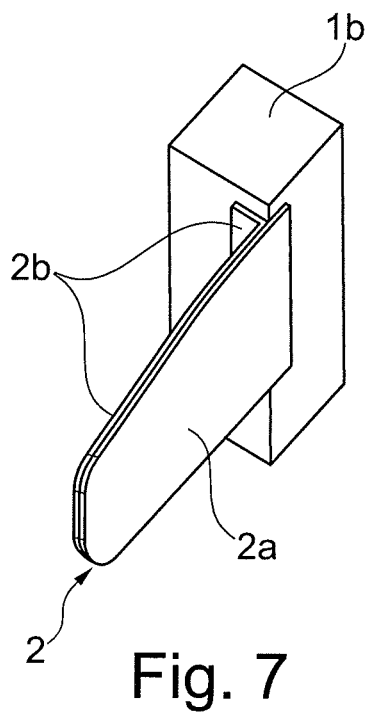
FIGS. 7 and 8 show, highly abstract in isometric representation, further possible attachment concepts for a cover element on a wheel spoke.

FIG. 7 shows another possibility for making a glue connection or some other connection between a cover element 2 (or cap element) and a spoke 1b, merely in theory. Here, the cover element 2 consists of two plate elements 2a, 2b, being formed from materials with different coefficients of thermal expansion lying firmly against each other by their larger plate surfaces over a broad region. In the end region of the cover element 2 in which or by which it is fastened to the spoke 1b, the plate element 2b is angled with respect to the plate element 2a, i.e., an end strip of the plate element 2b protrudes from the plate surface of the plate element 2a at a right angle, for example. With the corner structure so formed, the cover element 2 may then be glued firmly and securely to a corresponding corner section of the spoke 1b.

Figure 8:
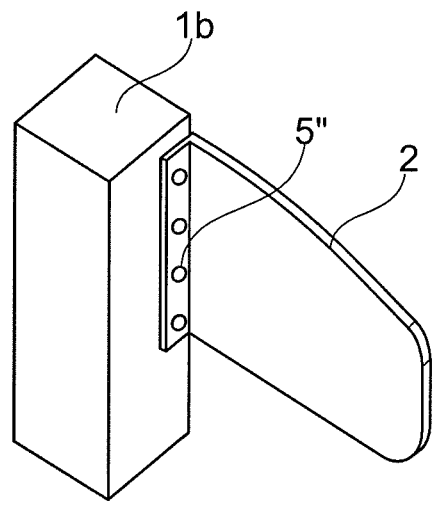

Another possibility of fastening a cover element 2 (or cap element) to the spoke 1b is shown by FIG. 8. Here as well, an end strip of the cover element 2 provided for the fastening is angled, but here completely, unlike FIG. 7, i.e., in the case of several plate elements lying one on top of another they are all angled. This angled end strip is now suitably flanged directly onto an inner side of the spoke 1b facing the space (W) between the spokes, e.g., glued on and/or screwed on, or connected by form fit in addition to an integrally bonded glue connection in the manner of a clip connection at a number of form-fitting points 5", here four points. This form-fitting connection has an undercut and can be formed by circular holes, for example in the spoke 1b, and therewith interacting spherical elements on the cover element 2, which are pressed with slight elastic deformation into the respectively assigned hole in the spoke 1b.

Figure 9:
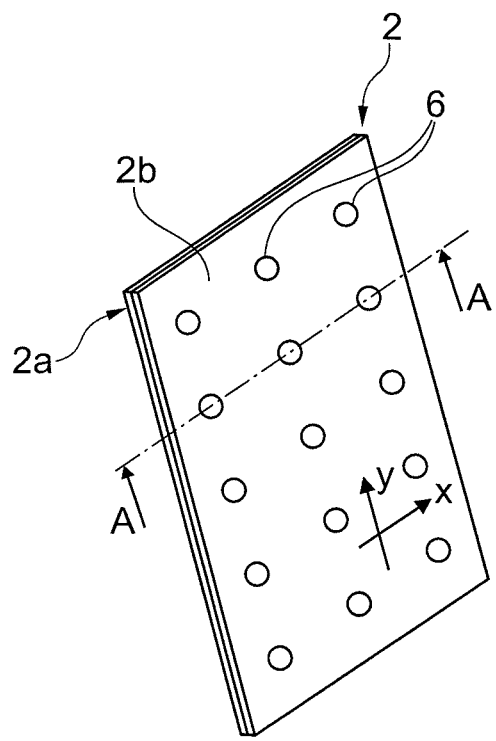
FIG. 9 shows one possible construction of a cover element in such a representation.
Figure 10:
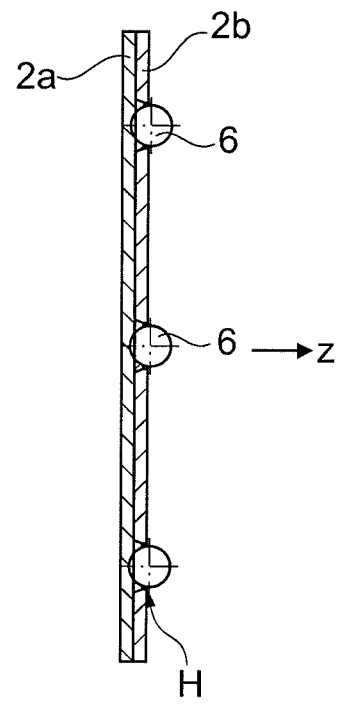
FIG. 10 shows (rotated) the section A-A of FIG. 9.

With the aid of FIGS. 9 and 10, one possible and solely form-fitting connection similar to the last mentioned form-fitting connection shall now be explained between two plate elements 2a, 2b of a cover element 2 lying against each other. Holes are made in a plate element 2b situated at the top in FIG. 9 and at the right in the cross section view of FIG. 10, through which in the assembled state of the plate elements 2a, 2b protrudes each time a spherical element 6, which is firmly attached (e.g., welded) at a suitable site on the plate element 2a at the bottom in FIG. 9 (or at the left in FIG. 10), at least far enough so that an undercut H is formed, as shown by FIG. 10. Insofar as circular holes are involved in the plate element 2b, the two plate elements 2a, 2b are in this way fixed entirely by form fit relative to each other not only in the z-direction of a Cartesian coordinate system perpendicular to the plate surface, but also in the x-direction and y-direction of this coordinate system situated with its origin for example in the plane of the plate surface between the two plate elements 2a, 2b. These FIGS. 9 and 10 do not show an especially preferred embodiment, discussed above prior to the description of the figures, whereby said holes (in the plate element 2b) are formed as oblong holes and arranged such that a slight relative movement between the plate elements 2a, 2b is possible in the aforementioned coordinate system, for example in the y-direction, while a fixed form-fitting connection is presented only in the x-direction and z-direction. Thus, the axis about which a correspondingly constructed cover element made from at least two plate elements 2a, 2b curves under differential temperature-dependent thermal expansion can be determined specifically. Moreover, once again briefly discussing the making of the plate elements 2a with the spherical elements 6 firmly connected to them, the spherical elements 6 and the plate elements 2a may consist of a thermoplastic material and be integrally bonded together by ultrasound welding.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle wheel having a hub and spokes with spaces arranged between the spokes, comprising:
    cover elements respectively provided for the spaces between the spokes, said cover elements not entirely covering the respective spaces between the spokes;
    rigid cap elements respectively provided for the spaces between the spokes in addition to the cover elements, wherein
    a respective cover element of the cover elements deforms according to temperature such that, at higher temperatures, a passage of air through a region of a space between the spokes is opened, which passage is otherwise covered by the respective cover element at lower temperatures, and
    a respective rigid cap element of the rigid cap elements continuously covers the associated space between the spokes, and
    the rigid cap elements have a configuration which deviates for a portion from a flat shape and is curved outward away from the outside of the wheel, such that an associated cover element deformed toward an inside of the wheel at higher temperatures frees up the passage of air through the space between the spokes and at lower temperatures in the non-deformed state prevents such a passage of air despite the curvature of the rigid cap element.

2. The vehicle wheel as claimed in claim 1, wherein sections of the spaces between the spokes which are adjacent to the hub are open continuously.

3. The vehicle wheel as claimed in claim 1, wherein the respective cover element deforming according to the temperature is composed of at least two plate elements lying one against the other, which are connected together in a form-fitting manner at several discrete points in regard to at least one axial direction of a coordinate system situated in a contact surface of the plate elements and perpendicular to the contact surface.

4. The vehicle wheel as claimed in claim 3, wherein the form-fitting connections are formed by circular holes or oblong holes in the first plate element and spherical elements interacting therewith on the second plate element.

5. The vehicle wheel as claimed in claim 4, wherein the oblong holes are oriented such that a temperature-dependent curving of the temperature-dependent deforming cover element occurs about an axis extending at least approximately in the radial direction of the wheel.

6. The vehicle wheel as claimed in claim 1, wherein the cover elements and/or the rigid cap elements are glued to the spokes of the wheel.

7. The vehicle wheel as claimed in claim 1, wherein the cover elements and/or the rigid cap elements are connected to the spokes by releasable force-locking and/or by form-fitting at multiple points.

8. The vehicle wheel as claimed in claim 1, wherein the cover elements are constructed in layers from plastic material with differing fraction of reinforcing fibers in the individual layers.

9. A vehicle wheel having a hub and spokes with spaces arranged between the spokes, comprising:
    two cover elements respectively provided for each of the spaces between the spokes, the two cover elements being arranged next to one another in a circumferential direction of the vehicle wheel, and being secured to different spokes,
    the two cover elements deforming according to temperature such that, at higher temperatures, a passage of air through a region of the space between the spokes is open, which region is otherwise covered by the two cover elements at lower temperatures, wherein
    in the non-deformed state, the two cover elements border closely against one another via edges facing away from the spokes, and
    in the deformed state, one of the two cover elements is curved outward away from the vehicle, viewed in a direction of the vehicle wheel's axis of rotation, and the other of the two cover elements is curved inward toward the vehicle, viewed in the direction of the vehicle wheel's axis of rotation.

10. The vehicle wheel as claimed in claim 9, wherein sections of the spaces between the spokes which are adjacent to the hub are open continuously.

11. The vehicle wheel as claimed in claim 9, wherein each of the two cover elements deforming according to the temperature is composed of at least two plate elements lying one against the other, which are connected together in a form-fitting manner at several discrete points in regard to at least one axial direction of a coordinate system situated in a contact surface of the plate elements and perpendicular to the contact surface.

12. The vehicle wheel as claimed in claim 11, wherein the form-fitting connections are formed by circular holes or oblong holes in the first plate element and spherical elements interacting therewith on the second plate element.

13. The vehicle wheel as claimed in claim 12, wherein the oblong holes are oriented such that a temperature-dependent curving of the temperature-dependent deforming cover elements occurs about an axis extending at least approximately in the radial direction of the wheel.

14. The vehicle wheel as claimed in claim 9, wherein the two cover elements are glued to the spokes of the wheel.

15. The vehicle wheel as claimed in claim 9, wherein the two cover elements are connected to the spokes by releasable force-locking and/or by form-fitting at multiple points.

16. The vehicle wheel as claimed in claim 9, wherein the two cover elements are constructed in layers from plastic material with differing fraction of reinforcing fibers in the individual layers.

* * * * *